United States Patent Office 3,613,395
Patented Oct. 19, 1971

3,613,395
SHAFT COUPLING DEVICE
Junichi Shigeura, Amagasaki, Japan, assignor to Mitsubishi Denki Kabushiki Kaisha, Tokyo, Japan
Filed May 18, 1970, Ser. No. 38,119
Int. Cl. F16d 3/18
U.S. Cl. 64—9 R
5 Claims

ABSTRACT OF THE DISCLOSURE

The disclosed coupling device comprises a pair of annular elastic members opposingly disposed on nuts threaded on the end portions of the driving and driven shafts. A resilient disc is disposed between the elastic members with having clearances therebetween. The holding plate is in the form of a circular disc decreased in thickness at its central portion.

BACKGROUND OF THE INVENTION

This invention relates in general to a shaft coupling device disposed between a driving shaft driven by an electric motor for driving electric vehicles and a driven shaft operatively coupled to the driving shaft to transmit a power to the wheel sides.

Upon transmitting a power from the spring weight system including an electric motor and a driving shaft to the unspring weight system including wheels and a driven shaft, the connection of both systems is generally required to have a high flexibility thereby to prevent vibrations, shocks, etc. caused on the unspring weight system from being transmitted to the spring weight system for the purpose of improving a comfortable ride in the vehicle.

Conjointly with the recent tendency to greatly speed up electric vehicles as well as much increasing their outputs, improvements in such connections or couplings have given rise to one of the important problems that must be solved as a part of improvements in drive means.

DESCRIPTION OF THE PRIOR ART

The conventional type of shaft coupling devices referred to has comprised a pair of external gears fixed on the adjacent end portions of the driving and driven shaft, a pair of internal gears meshing with the external gears and having sandwiched therebetween a resilient disc to be connected together into a unitary structure and one helical spring disposed between the resilient disc and each of the external gears. The coupling devices have been successively operated to some extent but have been disadvantageous in that, in operation, the helical springs might not only be resonant in the axial direction leading to facilitating wear of the gears, but also in high speed operation the springs might often produce the noise not negligible.

SUMMARY OF THE INVENTION

It is, therefore, one object of the invention to provide a shaft coupling device decreased in vibration which results in occurrence of noise and of abrasion of springs on both the external and internal gears.

It is another object of the invention to provide a shaft coupling device capable of being easily assembled and disassembled.

It is a further object of the invention to provide a shaft coupling device simple in construction and strong in its strength.

It is a still further object of the invention to provide a new and improved shaft coupling device easily converted from the conventional devices.

BRIEF DESCRIPTION OF THE DRAWING

For better understanding of the invention, reference should be had to the following description taken in conjunction with the accompanying drawing in which.

DESCRIPTION OF THE PREFERRED EMBODIMENT

Figure 1:
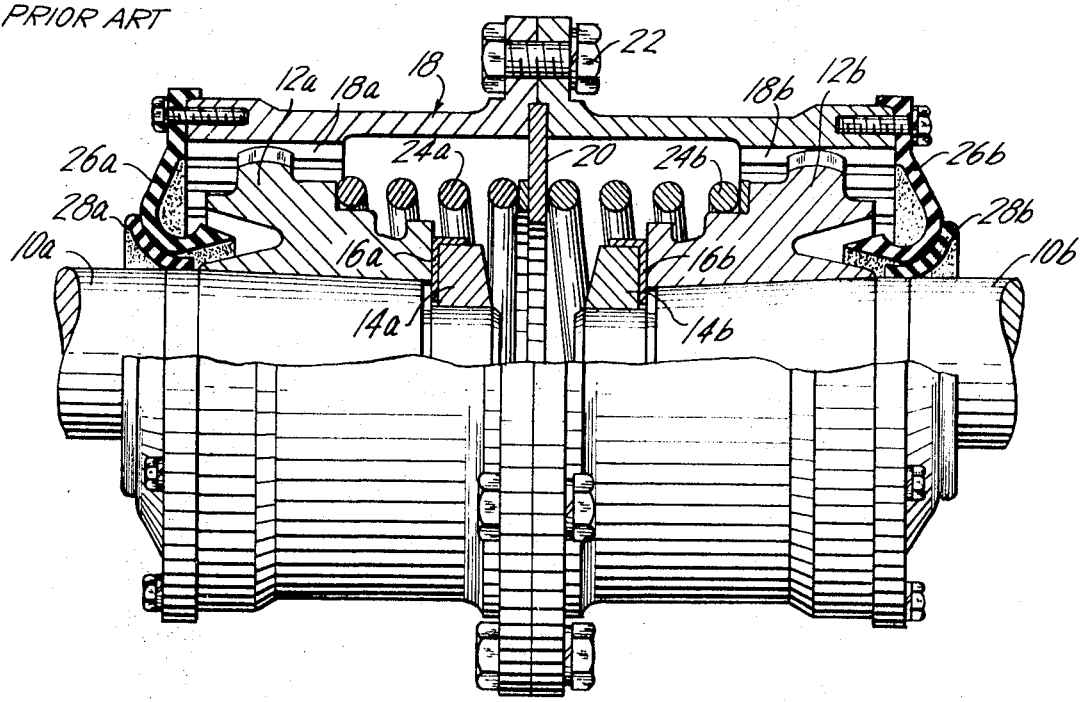
FIG. 1 is a plan view, partly in longitudinal section, of a shaft coupling device constructed in accordance with the principles of the prior art.

Referring now to FIG. 1 of the drawing, it is seen that a pair of driving and driven shafts 10a and b respectively, are disposed in coaxial opposite relationship to form a spacing between the opposite ends thereof. The shafts 10a and b has snugly fitted onto the respective tapered end portions a pair of external gears 12a and b engaging lock nuts 14a and b screw threaded on the ends of the shafts through washers 16a and b respectively to be prevented from disengaging from the respective shafts. A pair of internal gears 18a and b encircle and mesh the associated external gears 12a and b and have an annular resilient disc 20 sandwiched between the opposite end thereof. Then the opposite ends of the internal gears 18a and b are connected together by bolt and nut means 22 to form a cylindrical housing for the device generally designated by the reference numeral 18. One helical spring 24a or b is interposed between each of the external gears 12a or b and the resilient disc 20 tending to push both the external gears 12a and b externally or away from each other. Annular openings between both the shafts 10a and b and those ends of the internal gears 18a and b remote from each other are closed by a first and a second dust keepers 26a, 28a and 26b, 28b respectively made of any suitable flexible material such as rubber for the purpose of preventing the ingress of dust into the device and the leakage of a lubricant involved within the device. More specifically, each of the first dust keepers 26a and b is fixed at its outer peripheral edge to each of the ends of the coupling housing 18 while each of the second dust keepers 28a and b is fitted at its inner peripheral edge to each of the shafts 10a and b, and the dust keepers 26 and 28 are positioned such that their substantially free ends are brought into an intimate contact relationship thereby to seal the interior of the device. Even in operation, this intimate contact between the first and second dust keepers is fully maintained owing to the deformations of the dust keepers due to the centrifugal forces exerted upon both the first and second dust keepers.

In operation, an electric motor (not shown), for example, is energized to impact to the driving shaft 10a a torque which is transmitted through the external gear 12a, the internal gear 18a, and the internal gear 18b to the external gear 12b integral with the driven shaft 10b. Under these circumstances, vibrations, shocks, etc. may occur on the side of the driven shaft 10b. Such vibrations, shocks, etc. can be effectively absorbed partly by the relief of the toothed portions of the external gears 12a and b and mainly by the helical springs 24a and b compressible or expandable in response to such vibrations, shocks, etc.

In the arrangement, however, the mass system provided by the coupling housing 18 formed of the internal gears 18a and b and the bearing discs 20 is always carried at both ends under the resilient pressure through the helical springs 24a and b. In operation, the internal gears 18a and b may effect an axial movement relative to either or both of the external gears 12a and b. This axial relative movement causes the springs 24a and b, the coupling housing 18 and the bearing disc 20 to effect a resonance in the axial direction, whereby the toothed portions of the gears unusually slide along each other facilitating their wear. Further, in high speed operation the transversal rigidity of each spring 18a or b may not withstand the centrifugal force applied thereto by the springs will vibrate in the direction of the centrifugal force leading to the generation of noise. Such noise is in most cases not negligible.

In addition, it is noted that the helical springs 24a and b are assembled in the device while they are maintained in their initially tensioned state. This causes the operations of assembling and disassembling of the device to be difficult to be performed.

The invention contemplates to eliminate the abovementioned disadvantages of the prior art devices such as shown in FIG. 1 while retaining the advantages thereof and will be subsequently described in conjunction with FIG. 2 wherein like reference numerals designate the components identical to those shown in FIG. 1.

Figure 2:
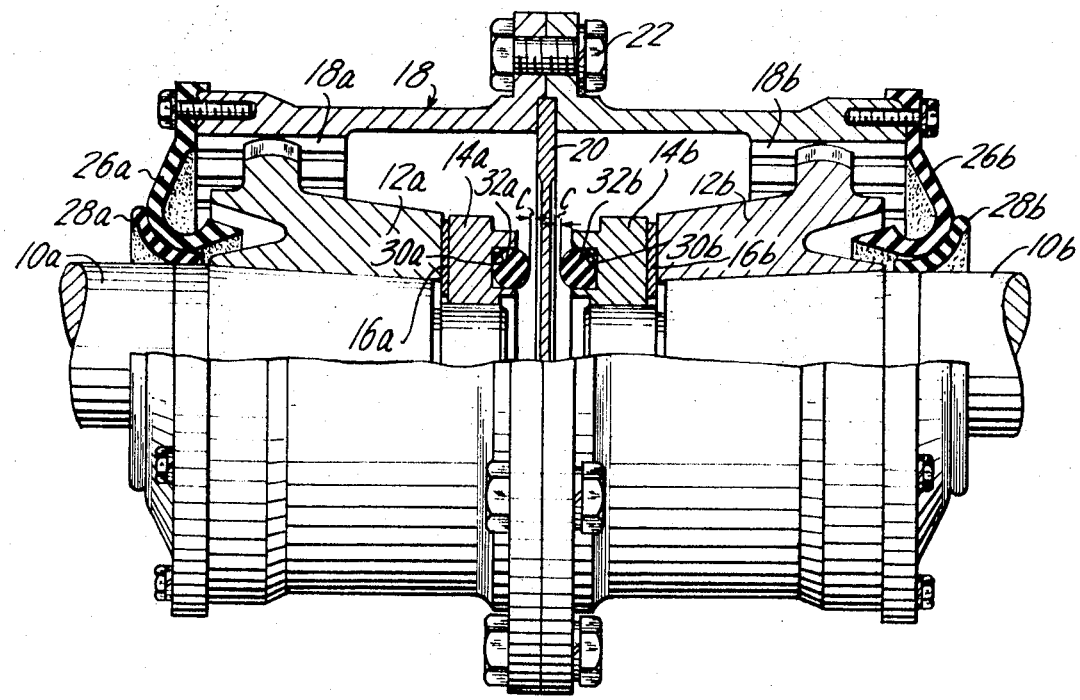
FIG. 2 is a plan view, partly in longitudinal section, of a shaft coupling device constructed in accordance with the principles of the present invention.

An arrangement shown in FIG. 2 is similar to that illustrated in FIG. 1. By comparing FIG. 2 with FIG. 1, it is readily seen that the arrangement of FIG. 2 includes no helical springs 24a and b as shown in FIG. 1. Instead, the lock nuts 14a and b are provided on the opposite end faces with annular grooves 30a and b in directly opposite relationship. Then one annular shock absorber 32a or b of any suitable elastic material such as rubber is rigidly inserted into each of the grooves 30a or b to form clearance C between thereof and the resilient disc 20.

As shown in FIG. 2, the disc resilient 20 has its central portion whose opposite surfaces are reduced in thickness but not of an annular type such as shown in FIG. 1. The shock absorbers 32a and b each projects beyond the end face of the associated lock nut 14a or b and opposes to the adjacent reduced portion of the disc 20 to form a gap C therebetween. In other respects, the arrangement is identical to that shown in FIG. 1.

In operation, vibrations, shocks, etc. can cause a relative movement between the driving and driven shafts 10a and b respectively and therefore a relative displacement between the external gears 12a and b. As in the arrangement of FIG. 1, this relative movement between the gears 12a and b is partly accommodated by the relief of the toothed portions thereof. Further, it is sufficiently accommodated by the movements of both the shafts 10a and b equal in magnitude to the respective clearance C plus the elastic deformation of the shock absorbers 32a and b. This ensures that the external gears 12a and b are maintained in mesh with the associated internal gears 18a and b while a power is effectively transmitted from the driving shaft 10a to the driven shaft 10b.

As above described, the coupling device of the present invention includes the resilient members 32a and b disposed on the lock nuts 14a and b for the external gears 12a and b while the helical springs 24a and b previously employed are omitted. The omittance of the springs 24a and b provides a mass system composed of the internal gears 18a and b and the resilient disc 20 but not including the helical springs 24a and b with the result that the coupling housing 18 or the internal gears 18a and b and the resilient disc 20 are free from an axial resonance due to the springs 24, while at the same time the device is free from vibrations, noise, etc. previously developed in high speed operation due to the deformation of the springs 24 in the direction of the centrifugal force.

Also the device can be easily assembled and disassembled without the necessity of using special tools.

Further, it is to be noted that the resilient members or shock absorbs 32a and b are fixed to the lock nuts 14a and b for the external gears 12a and b but not directly secured to the power transmitting parts such as the external or internal gears 12a and b or 18a and b in the prior art type arrangement. This eliminates the necessity of making any change or modification for the purpose of securing the shock absorbers 32a and b to the power transmitting parts. In order to apply the invention to the prior art devices, it is required only to change the lock nuts and, if necessary, the resilient disc. Also the shock absorber can be periodically renewed only by removing the lock nuts. Further, the lock nuts and/or the washer therefore can be suitably selected in thickness to easily effect the fine adjustment of the clearances between the shock absorbers and the resilient disc which would greatly reduce labor required in assembling and disassembling of the device.

What I claim is:

1. A shaft coupling device for coupling a driving shaft to a driven shaft comprising, in combination, a pair of external gears fixedly secured on the opposite end portions of said shafts, a pair of internal gears meshing with the associated external gears and disposed in end-to-end relationship, a resilient disc sandwiched between the opposite ends of said internal gears, said internal gears and said resilient disc being connected together into a unitary structure and one resilient member disposed on that end of each external gear adjacent said resilient disc to oppose to the adjacent faces of said resilient disc.

2. A shaft coupling device as claimed in claim 1 comprising one lock nut screw threaded on the end of each of said shafts to lock an associated one of said external gears on said shafts.

3. A shaft coupling device as claimed in claim 1, wherein said resilient disc has its central portion decreased in thickness as compared with its peripheral portion.

4. A shaft coupling device as claimed in claim 1 comprising one lock nut screw threaded on the end of each of said shafts to lock an associated one of said external gears on said shafts, said resilient disc having its central portion decreased in thickness as compared with its peripheral portion.

5. A shaft coupling device as claimed in claim 1 comprising a first dust keeper fixed at the outer peripheral edge to that ends of each internal gear remote from the other internal gear and having the inner peripheral edge reaching the associated shaft and a second dust keeper fixed at the outer peripheral edge to ends of said shaft and having its outer peripheral edge capable of intimately contacting said first dust keeper to seal the interior of the device.

References Cited

UNITED STATES PATENTS 2,592,309   4/1952   Meier _____ 64—9
3,279,216   10/1966  Spaulding, Jr. _____ 64—9

KENNETH W. SPRAGUE, Primary Examiner